United States Patent

Komoda

(10) Patent No.: US 8,203,976 B2
(45) Date of Patent: Jun. 19, 2012

(54) INTERFACE DEVICE AND IMAGE FORMING APPARATUS

(75) Inventor: Nobuhito Komoda, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 976 days.

(21) Appl. No.: 12/014,499

(22) Filed: Jan. 15, 2008

(65) Prior Publication Data

US 2008/0170604 A1  Jul. 17, 2008

(30) Foreign Application Priority Data

Jan. 16, 2007  (JP) ................. 2007-007009

(51) Int. Cl.
*H04L 5/14* (2006.01)
*H04L 12/50* (2006.01)
*G06F 13/00* (2006.01)

(52) U.S. Cl. ............... 370/276; 370/366; 710/31

(58) Field of Classification Search .......... None
See application file for complete search history.

(56) References Cited

U.S. PATENT DOCUMENTS

| 2005/0201305 | A1* | 9/2005 | Shibata et al. | 370/282 |
| 2008/0133805 | A1* | 6/2008 | Liao et al. | 710/71 |
| 2008/0136903 | A1* | 6/2008 | Takada et al. | 348/65 |

FOREIGN PATENT DOCUMENTS

| JP | 2002-254763 | 9/2002 |
| JP | 2003-45578 | 2/2003 |
| JP | 2003-196227 | 7/2003 |
| JP | 2005-18312 | 1/2005 |

OTHER PUBLICATIONS

Office Action mailed Oct. 18, 2011, in Japanese Patent Application No. 2007-007009, filed Jan. 16, 2007.

* cited by examiner

*Primary Examiner* — Marcus R Smith

(74) *Attorney, Agent, or Firm* — Oblon, Spivak, McClelland, Maier & Neustadt, L.L.P.

(57) ABSTRACT

An interface device includes a parallel-to-serial converting unit, a driver, a receiver, and a serial-to-parallel converting unit. The parallel-to-serial converting unit converts parallel signals into a single-ended signal. The driver converts the single-ended signal from the parallel-to-serial converting unit into a differential signal and transmits the differential signal to an external device via signal lines. The receiver converts a differential signal received via the signal lines from an external device into a single-ended signal. The serial-to-parallel converting unit converts the single-ended signal from the receiver into parallel signals. A direction in which the differential signal is to be transmitted is determined based on a control signal.

3 Claims, 9 Drawing Sheets

INTERFACE DEVICE AND IMAGE FORMING APPARATUS

CROSS-REFERENCE TO RELATED APPLICATIONS

The present application claims priority to and incorporates by reference the entire contents of Japanese priority document, 2007-007009 filed in Japan on Jan. 16, 2007. The present application incorporates by reference the entire contents of Japanese application, 2006-039500 filed in Japan on Feb. 16, 2006.

BACKGROUND OF THE INVENTION

1. Field of the Invention

The present invention relates to a technology for bidirectional data transmission.

2. Description of the Related Art

In a recent data communication system, data (parallel signals) are transmitted via a plurality of parallel signal lines of a bus. A magnetic force generated by a current flowing through a signal line may interfere a signal transmitted thorough an adjacent signal line, and thus, electric induction may be caused, which results in unintended current flow. Such unintended current flow causes signal interference that leads to an erroneous operation. If the signal lines have different lengths, signal delay may occur.

When signals are transmitted via such parallel signal lines for a long distance, for example, a ground (GND) can be provided between the lines to prevent signal interference. However, with the GND, waveform distortion due to an increase in the number of signal lines (wires) and resistance on a signal path may lead to erroneous detection of a signal. In addition, as difference increases in length of the parallel lines, the parallel signals are more likely to arrive at different timings. To avoid the above possibility, a serial communication bus such as a universal serial bus (USB) and an Institute of Electrical and Electronics Engineers (IEEE) 1394 bus can be employed. While inconvenience such as signal delay is not caused in the serial communications, a complicated protocol is required for a serial communication signal. The serial communications may be unsuitable for low-noise communications between terminal devices from the viewpoint of electromagnetic interface (EMI).

To achieve the long distance low-noise communications, differential signaling is employed in which two signal lines are used with respect to one signal line and noise on the signal lines is cancelled based on a difference between signals on the signal lines. The low voltage differential signaling (LVDS) is a signaling technology for low-voltage and low-noise transmission, in which a phase of a signal on one of two signal lines is inverted to halve the amplitude of the voltage. However, the existing LVDS technology can achieve only unidirectional communications (unidirectional transmission) and cannot achieve bidirectional communications (bidirectional transmission) using, for example, a data bus.

A technology called "Bus LVDS (BLVDS)", in which signals can be transmitted via a plurality of signal lines of a bus using the LVDS technology, has been put into practice. However, in this technology, each signal line achieves unidirectional communications only. Although an LVDS device that achieves bidirectional communications is available, such LVDS device prepares a signal line for communication in each direction. Therefore, to achieve communications using a bus having a plurality of signal lines with such an LVDS device, a large number of devices and large amount of wiring corresponding to the signal lines are necessary, which increases the cost. A signal transmitted via an existing bus such as a CPU bus (hereinafter, "bus signal") cannot be transmitted by the LVDS. To transmit such a bus signal by the LVDS, for example, an address bus and a control signal are required in addition to a data bus for bidirectional transmission, which further increases the cost.

A typical data communication system of a large-sized copier as an image forming apparatus is explained below. A signal line extends from a printed circuit board (PCB) on which a CPU is installed for a long distance to each load controlled by the CPU. A copier generally includes a reading unit, a writing unit, a main control unit, and a sheet feeding unit. For example, the writing unit needs to include a sensor for detecting the size of a sheet. To detect widths of sheets in sizes of, for example, A4, A3, A2, A1, A0, B4, B3, B2, and B1, at least nine sensors are required to correspond to the number of sheet sizes.

In a case where the main control unit controls the nine sensors, each of the sensors needs three signal lines to be connected to a power source and signals, i.e., a total of 27 signal lines are required to be arranged for a long distance. Because the units of the copier need to control a large number of loads, a large number of signal lines are arranged as a wiring harness (i.e., the size of the wiring harness increases), which increases the cost and can be a cause of noise. Assembling the wiring harness into the apparatus decreases efficiency and increases the amount of wiring, which increases the cost.

To reduce the number of signal lines, a method can be employed of controlling a load of each unit via a PCB that is provided to each unit and that outputs/receives a signal to/from a main control PCB via, for example, serial communications. In this method, the function can be achieved while a signal line is arranged in each unit (not for a long distance). In addition, because only a few number of signal lines are required between the main control PCB and the units for serial communications, the size of the wiring harness can be reduced and efficiency in arranging the wiring harness can be improved.

Although the number of signal lines can be reduced with the above configuration, CPUs need to be installed on the PCBs of the units, respectively, in addition to that of the main control PCB, which increases the steps of developing software and requires a step for examining timing of serial communications. If integrated circuits (ICs) driven via a CPU bus are mounted on the PCBs of the units, respectively, and the main control PCB controls the PCBs via the CPU bus via parallel communications, the time required for developing software for each unit can be reduced. However, for example, an erroneous operation may be caused due to distortion of waveforms of the signal lines, which results from noise, or electromagnetic waves relative to the EMI may be caused.

When two signal lines are used for bidirectional communications by the LVDS as interface standards for transmitting differential signals, two termination resistors are provided to a driver and a receiver for a terminating process performed on the receiver side. To deal with signal reflection caused by mismatching between the termination resistors, one of the termination resistors is disabled.

Communications by the LVDS can be performed using a plurality of packages for bidirectional communications, each of which includes LVDS lines arranged separately as shown in FIG. 14, or by a method of performing point-to-point communications by converting a bus signal of, for example, the BLVDS into an LVDS signal as shown in FIG. 15. Regarding the method shown in FIG. 14, multiple lines such as a bus requires a plurality of packages, which increases the cost, and requires a large space on the PCB. Regarding the method shown in FIG. 15, although the bus signals can be transmitted via a small number of LVDS signal lines and unidirectional communications are achieved, bidirectional communications cannot be achieved. To achieve bidirectional communication with the BLVDS, a plurality of packages is necessary as in the case shown in FIG. 14.

A method for achieving bidirectional communications with an interface (I/F) for communications in one direction is disclosed in, for example, Japanese Patent Application Laid-open No. 2005-18312. In this method, communications in the opposite direction are achieved with a single-ended signal transmitted at a speed lower than that of an LVDS signal (not a differential signal but a signal of, for example, 5 V or 3.3 V with 0 (zero) V as a reference). A differential signal is transmitted with two signal lines to achieve unidirectional transmission, and a single-ended signal is transmitted to achieve communications in the opposite direction. A signal requiring high-speed transmission is transmitted using a differential signal, and a signal not requiring high speed transmission is transmitted using a single-ended signal.

Japanese Patent Application Laid-open No. 2002-254763 discloses an interface technology that achieves high-speed data transmission without a specific extending device. According to the technology, an I/F connecting a printer controller and a printer engine includes a control line capable of bidirectional communications, with which various types of control signals are transmitted, and a data line for transmitting image data from the printer controller to the printer engine. Because no control signals are required for transmitting the image data with this configuration, the image data can be transmitted at high speed.

However, the technology disclosed in Japanese Patent Application Laid-open No. 2005-18312 does not achieve bidirectional communications of the LVDS signals but is for performing unidirectional communications of the LVDS signal, and a single-ended signal is used for realizing communications in the opposite direction. In this case, the speed and type of the single-ended signal is limited and noise is caused. Specifically, this technology cannot be employed for bus signals, and the communications in the direction opposite to that of the LVDS signals is limited to transmission of an auxiliary signal. The technology disclosed in Japanese Patent Application Laid-open No. 2002-254763 also only achieves unidirectional communications of image data via the data lines.

SUMMARY OF THE INVENTION

It is an object of the present invention to at least partially solve the problems in the conventional technology.

According to an aspect of the present invention, there is provided an interface device. The interface device includes a parallel-to-serial converting unit that converts parallel signals transmitted in parallel into a single-ended signal; a driver that converts the single-ended signal output from the parallel-to-serial converting unit into a differential signal, and transmits the differential signal to an external device via a plurality of signal lines; a receiver that converts a differential signal received via the signal lines from an external device into a single-ended signal; a serial-to-parallel converting unit that converts the single-ended signal output from the receiver into parallel signals to be transmitted in parallel. The parallel-to-serial converting unit, the driver, the receiver, and the serial-to-parallel converting unit operate based on a control signal for controlling a direction in which the differential signal is to be transmitted on the signal lines.

According to another aspect of the present invention, there is provided an image forming apparatus. The image forming apparatus includes a parallel-to-serial converting unit that converts parallel signals transmitted in parallel into a single-ended signal; a driver that converts the single-ended signal output from the parallel-to-serial converting unit into a differential signal, and transmits the differential signal to an external device via a plurality of signal lines; a receiver that converts a differential signal received via the signal lines from an external device into a single-ended signal; a serial-to-parallel converting unit that converts the single-ended signal output from the receiver into parallel signals to be transmitted in parallel. The driver, the receiver, and the serial-to-parallel converting unit operate based on a control signal for controlling a direction in which the differential signal is to be transmitted on the signal lines.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
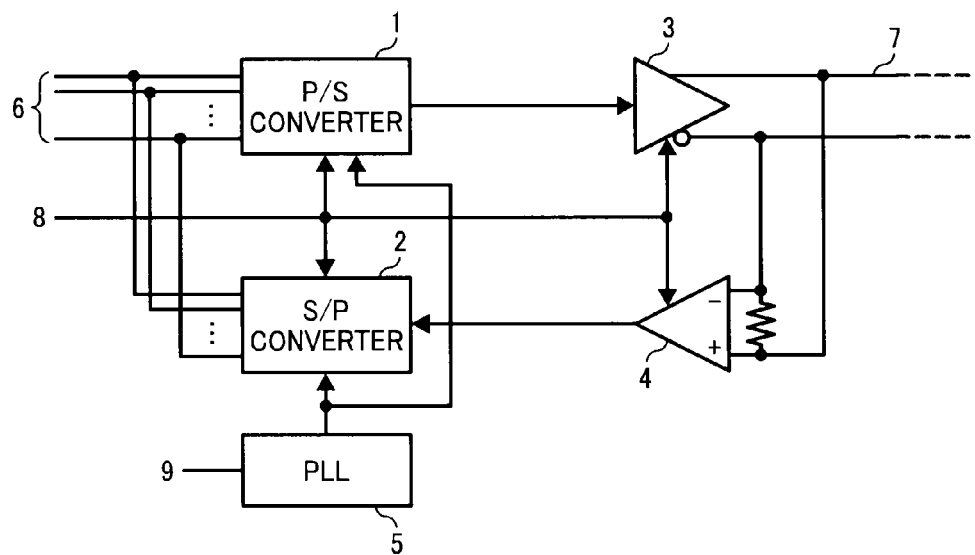
FIG. 1 is a circuit diagram of an I/F device according to a first embodiment of the present invention.

FIG. 1 is a circuit diagram of an interface (I/F) device according to a first embodiment of the present invention. The I/F device includes a parallel-to-serial (P/S) converter 1, a serial-to-parallel (S/P) converter 2, an LVDS driver 3, an LVDS receiver 4, a phase locked loop (PLL) 5, and an LVDS I/F 7.

The circuit shown in FIG. 1 achieves bidirectional communications by the LVDS. Data to be transmitted is input to the P/S converter 1. The P/S converter 1 loads the data to a shift register for serial data transfer according to a clock 9 multiplied by the PLL 5. The data is input from the shift register to the LVDS driver 3 and output as an LVDS signal that is a differential signal via the LVDS I/F 7 by the LVDS using two signal lines. When an LVDS signal is input to the circuit, oppositely as above, the LVDS signal transmitted via the LVDS I/F 7 by the LVDS is received by the LVDS receiver 4, and then, is input to the S/P converter 2. The signal converted by the S/P converter 2 is output as parallel data 6.

Figure 2:
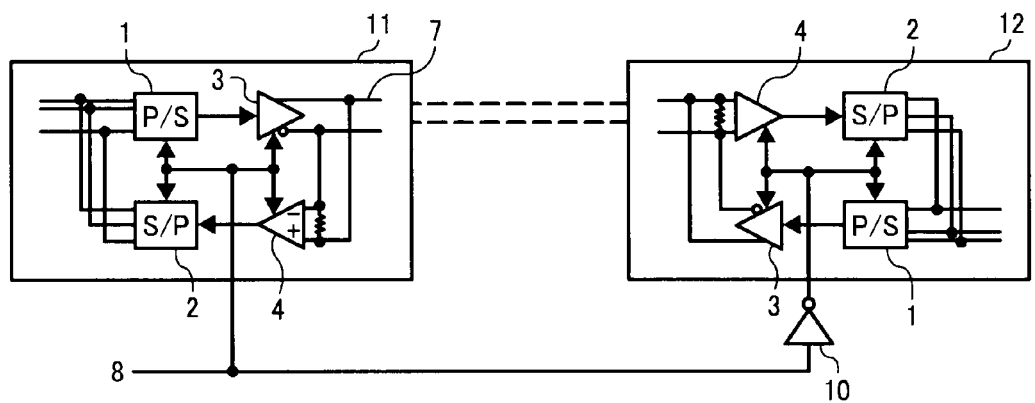
FIG. 2 is a circuit diagram of the I/F device for explaining an example of how a signal-direction control signal changes a signal direction in which a signal is transmitted by LVDS.

FIG. 2 is a circuit diagram for explaining how a signal-direction control signal 8 changes a signal direction in which a signal (data) is transmitted. As shown in FIG. 2, the signal-direction control signal 8 is input to the P/S converter 1, the S/P converter 2, the LVDS driver 3, and the LVDS receiver 4. If the signal-direction control signal 8 is at a high level (hereinafter, "H level"), a transmission block 11 serving as an LVDS data transmission unit becomes active. If the signal-direction control signal 8 is at a low level (hereinafter, "L level"), a reception block 12 serving as an LVDS data receiving unit becomes active.

The LVDS driver 3 converts a single-ended signal input thereto into two opposite LVDS signals to be transmitted by the LVDS (i.e., performs S/P conversion). The LVDS receiver 4 converts two opposite LVDS signals input thereto into a single-ended signal (i.e., performs P/S conversion). The P/S converter 1 loads the parallel data into the shift register to temporarily store the data therein and performs the P/S conversion by transmitting data such that bits of the register are sequentially transmitted from the first one.

Similarly, the S/P converter 2 performs the S/P conversion. Specifically, the bits of serial data sequentially transmitted are stored in the register from the first bit. Once all the data is stored in the register, the data is collectively transferred to an output port register. The P/S converter 1 and the S/P converter 2 can be selected depending on the purpose based on the signal-direction control signal 8 as an enable signal.

Although an LVDS signal is used as a differential signal in the first embodiment, any type of signal that is output and input via two signal lines can be used as a differential signal.

The signal-direction control signal 8 is used for controlling bidirectional transmission. A function block for transmitting data includes the P/S converter 1 and the LVDS driver 3. On the other hand, a function block for receiving data transmitted in the opposite direction includes the LVDS receiver 4 and the S/P converter 2. One of the functions of the function blocks need to be selected depending on the signal direction.

Specifically, when the signal-direction control signal 8 at the H level is input, the P/S converter 1 and the LVDS driver 3 are driven to transmit data. On the other hand, when the signal-direction control signal 8 at the L level is input, the S/P converter 2 and the LVDS driver 4 (an element that receives data) are driven to receive data.

The signal-direction control signal 8 can be output from a port as a different signal when data communications start, or can be a read/write control signal used for CPU bus control. When the signal-direction control signal 8 is used for unidirectional transmission, the level of a driver/receiver control signal is fixed depending on the function to be used.

Figure 14:
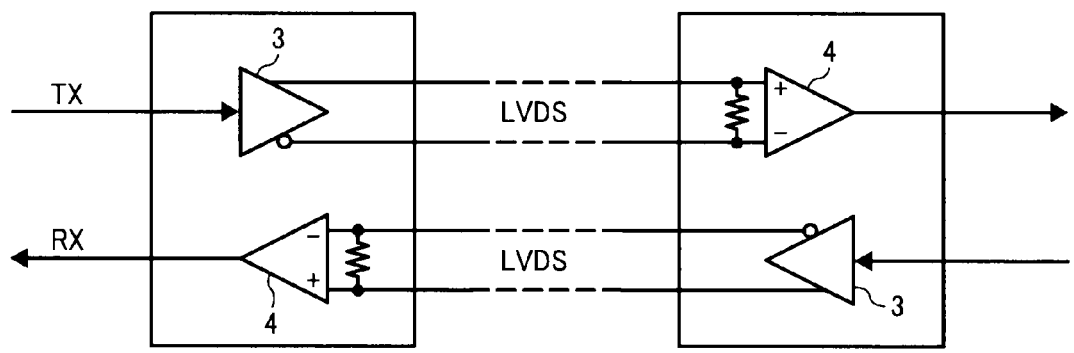
FIG. 14 is a circuit diagram for explaining a conventional technology for bidirectional communications by LVDS with a plurality signal lines.
Figure 15:
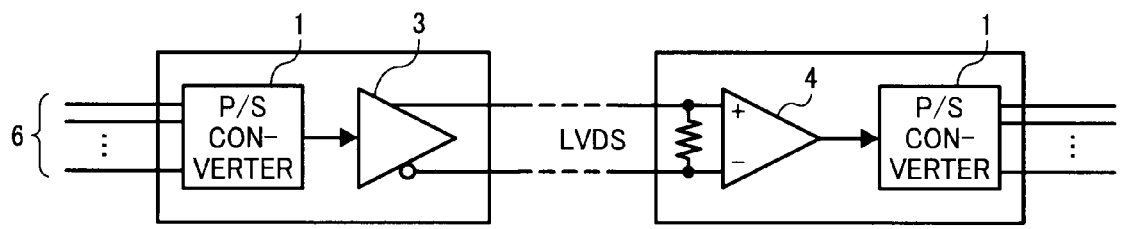
FIG. 15 is a circuit diagram for explaining another conventional technology for unidirectional communications performed by converting a bus signal such as a Bus LVDS signal into an LVDS signal.

A conventional communication interface is explained below in comparison with the LVDS interface capable of bidirectional communication with reference to FIGS. 14 and 15. FIG. 14 is a circuit diagram of an example of an LVDS bidirectional communication package that includes separate signal lines for the LVDS. The LVDS driver 3 transmits data and the LVDS receiver 4 receives data. Via each signal line, signals can be transmitted in one direction. FIG. 15 is a circuit diagram for explaining the BLVDS. Parallel data is input to the P/S converter 1 to be converted into serial data. The serial data is then input to the LVDS driver 3 and is output as an LVDS signal. Signals are transmitted in one direction (i.e., only unidirectional communications are achieved) with the configuration shown in FIG. 15. To receive a signal transmitted in the opposite direction, another package for receiving the signal is necessary.

Although the I/F device shown in FIG. 1 is applied to a copier in the first embodiment, the I/F is applicable to any type of apparatuses that transmit parallel signals by the LVDS for a long distance. The copier includes a reading unit, an image processing unit, an image data arranging unit, and a writing unit.

The reading unit reads an original (image) with, for example, a charge coupled device (CCD). Alternatively, the original is read by a contact sensor while being conveyed. The image processing unit includes a plurality of processors each performing necessary image processing such as shading correction and background removal.

A controller controls timing of outputting image data in an image system. The controller includes a plurality of processors and a storage unit such as a memory that is connected to the processors. Image data on which the image processing is performed is temporarily stored in a storage unit such as a hard disk of the controller. According to timing of outputting image data, required data is fetched and transmitted to the image data arranging unit.

The image data arranging unit includes a line memory corresponding to a writing width of an image. The data transmitted from the controller is arranged in the line memory based on an image area. A first-in/first-out (FIFO) memory is employed as the memory, and the data is sequentially transmitted to a writing control unit from the first bit. The writing unit that writes the image includes an optical device such as a laser diode (LD) and a driver integrated circuit (IC) that drives the optical device. Based on the data transferred thereto, the optical device is driven (flashes) to write the image. As explained below, a CPU inputs and outputs parallel signals shown in FIGS. 5 and 7. The CPU is not the controller for processing image data and serves as a main controller that controls the copier.

Operations of the copier in the first embodiment are explained below. The image read by the image reading unit such as a scanner is converted into digital data and output to the image processing unit. The data processed by the image processing unit is output to the controller that controls the system, and is temporarily stored in the storage unit such as a hard disk. Thereafter, the data is arranged in the line memory depending on conditions including modes and the number of copies to be made. Thereafter, the data is transferred as image writing data to the writing unit. Based on the timing of writing the image data, the optical device writes the image on a transfer sheet transferred from a sheet stock unit such as a sheet cassette.

According to the first embodiment, because the I/F device converts bidirectional signals transmitted in parallel into a serial signal and transmit the serial signal by the LVDS, bidirectional communications with low noise and high reliability can be achieved even when parallel signals are transmitted via multiple signal lines (i.e., data bus) for a long distance. In addition, because the parallel signals can be transmitted in the two directions with one package (the package includes elements for data transmission and data reception), the I/F device can be made at low cost and occupy less mounting space. Moreover, the I/F device enables connection via an existing bus such as a CPU bus by selecting or fixing functions of bidirectional transmission and unidirectional transmission with a signal direction control signal (explained in detail below). Because the I/F device can be in one package, the space saving and cost reduction of the copier can be achieved. In addition, parallel signals are converted into a serial signal, the number of signal lines of wiring harness can be reduced, which saves time for software development.

As shown in FIG. 1, the signal direction is selected based on the signal-direction control signal 8. Because the signal direction is controlled depending on the level of the signal-direction control signal 8 (signal level), signals at different levels need to be input respectively to the reception block 12 and the transmission block 11 shown in FIG. 2. As shown in FIG. 2, for example, a signal different from the LVDS signal is inverted by an inverting unit 10, and then, is input to the reception block 12 as a signal-direction control signal. With this, the transmission block 11 and the reception block 12 function properly.

Figure 3:
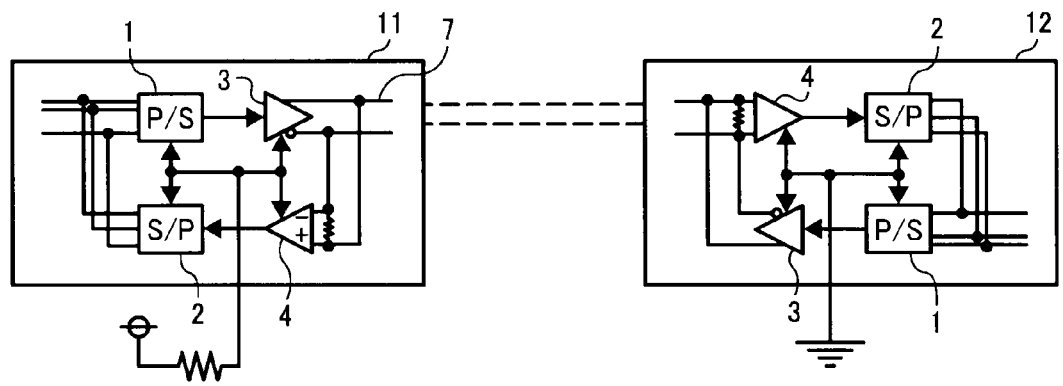
FIG. 3 is a circuit diagram of the I/F device for explaining another example of how a signal-direction control signal changes a signal direction in which a signal is transmitted by LVDS.

By inputting the signal-direction control signal 8 at a fixed level, the function can be fixed to one of receiving and transmitting the LVDS signals in the package. Therefore, when bidirectional transmission is not performed, each of the transmission block 11 and the reception block 12 can serve as a driver only or a receiver only. The control signal is grounded in the reception block 12, and a control signal of a predetermined voltage is applied to the transmission block 11. As shown in FIGS. 2 and 3, the transmission block 11 and the reception block 12 are in one package (i.e., a circuit configuration indicated by solid lines shown in FIGS. 2 and 3), and one of the functions of a driver and a receiver can be selected. The functions of the transmission block 11 and the reception block 12 are appropriately selected.

Figure 4:
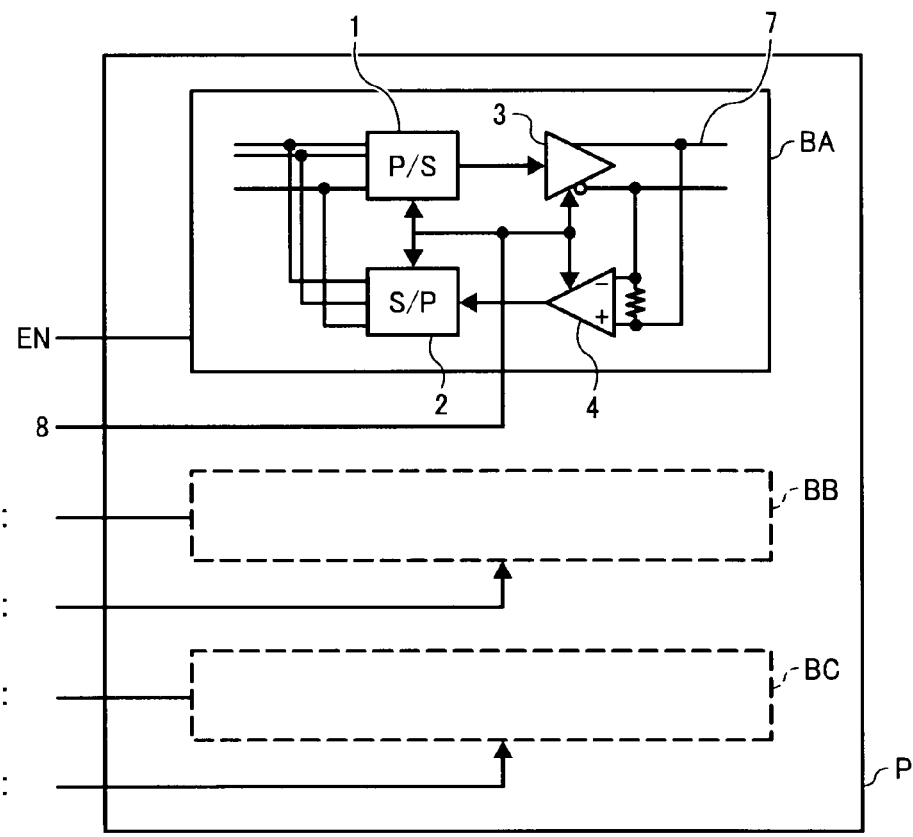
FIG. 4 is a circuit diagram of the I/F device for explaining a relationship between function blocks and a package.

A relationship between the function blocks and the package of the I/F device of the first embodiment is explained below with reference to FIG. 4. As shown in FIG. 4, a package P includes first to third function blocks BA, BB, and BC each including the P/S converter 1, the S/P converter 2, the LVDS driver 3, the LVDS receiver 4, and the LVDS I/F 7. Each of the function blocks BA, BB, and BC can be independently controlled. Depending on the function, the signal direction can be set with the signal-direction control signal 8. By controlling an enable signal EN (by adopting a usual method) in each of the function blocks BA, BB, and BC, an unnecessary function block is disabled.

Figure 5:
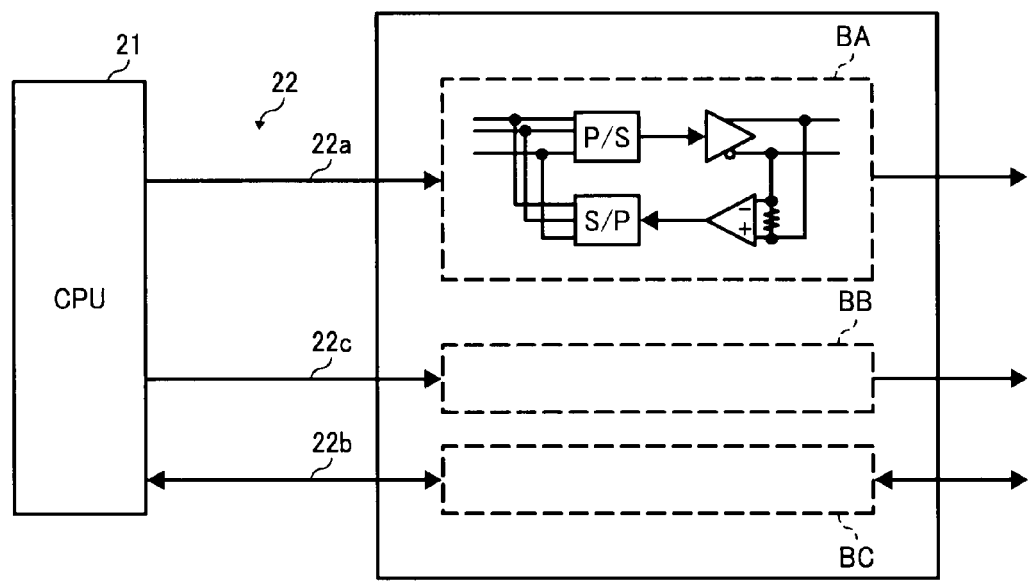
FIG. 5 is a circuit diagram of the I/F device for explaining a configuration of the I/F device including a CPU bus.

A configuration of the I/F device including a CPU bus 22 in the first embodiment is explained with reference to FIG. 5. The CPU bus 22 includes an address bus 22a, a data bus 22c, and a control signal bus 22b for transmitting control signals (for example, a read signal, a write signal, and a chip selecting signal). These signals are allocated to the first to third function blocks BA, BB, and BC. For example, because the control signal bus 22b is used for bidirectional communications, the third function block BC is used for bidirectional transmission by the LVDS. Because the address bus 22a and the data bus 22c are used for unidirectional transmission, the first and second function blocks BA and BB are set as LVDS drivers. This setting needs to be performed on a PCB to receive a signal as well, and the first and the second function blocks BA and BB thereof are used as receivers and the third function block BC is used for bidirectional transmission.

Figure 7:
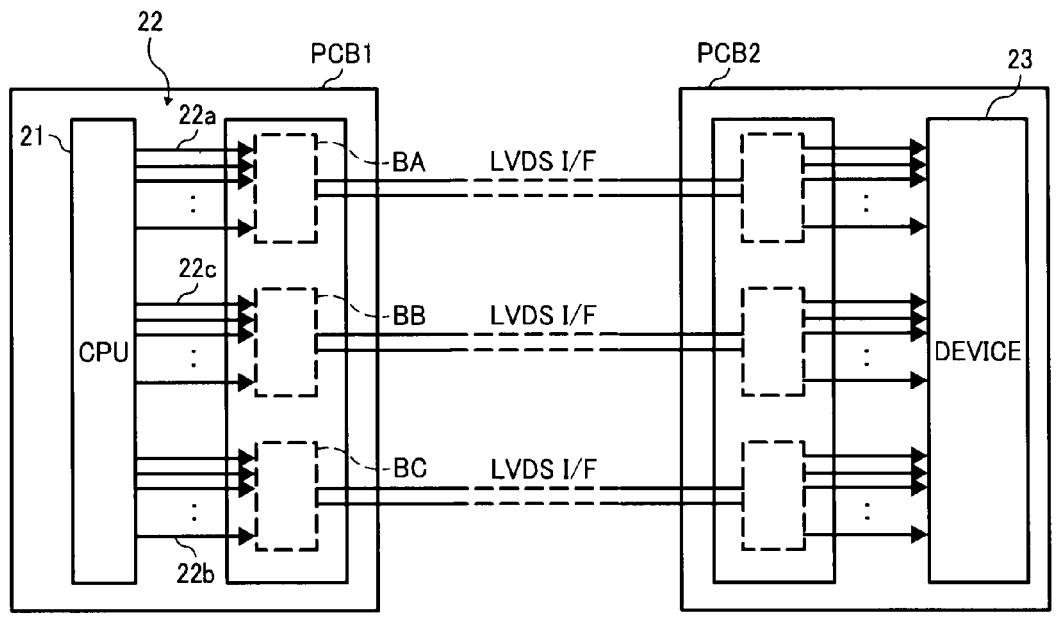
FIG. 7 is a circuit diagram of the I/F device for explaining operations of the I/F device shown in FIG. 5.

Operations of the I/F device including the CPU bus 22 in the first embodiment are explained with reference to FIG. 7. A PCB1 includes a CPU 21, and a PCB2 is controlled by the CPU 21.

The CPU bus 22 is used when the CPU 21 writes data to a device 23 of the PCB2 (i.e., performs a writing operation) and when the CPU 21 reads data from the device 23 (i.e., performs a reading operation). When the writing operation is performed, the CPU 21 transmits data to the device 23, i.e., performs unidirectional communication. Thus, it suffices that the PCB1 only functions as a driver of an LVDS signal and the PCB2 only functions as a receiver of the LVDS signal. On the other hand, the reading operation is performed in a way that the CPU 21 issues an instruction to the device 23, the device 23 transmits data in response to the instruction, and the CPU 21 receives the data from the device 23.

For the reading operation, first, the signal-direction control signal 8 is input to the PCB2 in addition to an address signal and a control signal so that the signal direction in the data bus 22c is determined. Based on the signal-direction control signal 8, the third function block BC is set having a function of receiving an LVDS signal.

Figure 6:
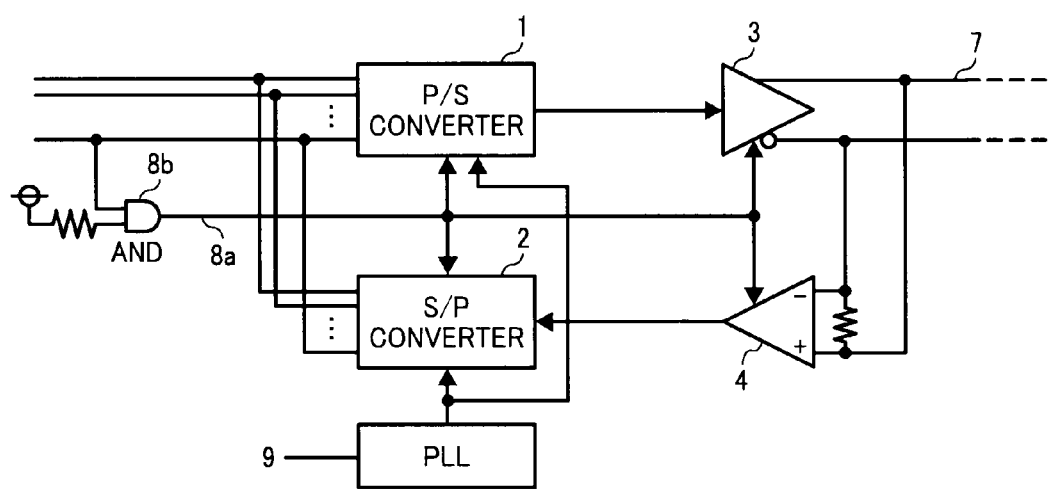
FIG. 6 is a circuit diagram of the I/F device for explaining how to generate and how to use a signal-direction control signal in the I/F device shown in FIG. 5.

The signal-direction control signal and its use are explained below in detail with reference to FIG. 6. After a read signal (i.e., a signal at the L-level, which is issued by the CPU as an instruction for the reading operation) and a signal-direction control signal 8a output from an AND circuit based on a signal at the H level are input to a signal-direction control signal terminal, the read signal is at the H level when no communication is performed or when the writing operation is performed (i.e., no instruction for the reading operation is made). Thus, the output of the AND circuit 8b is at the H level, and the third function block BC is set as a driver. Only when the read signal is input, the level of the signal-direction control signal 8 changes to the L-level. Thus, the LVDS can be set for the receiving operation. With this method, the control signal need not be output using a different port and the control can be achieved based on the level of the read signal.

Although specific timing of transmitting signals via the CPU bus 22 is determined to read data surely, the read signal (i.e., the control signal at the L-level) can be appropriately detected because there is a certain amount of time after the read signal is output until the data is received.

Figure 8:
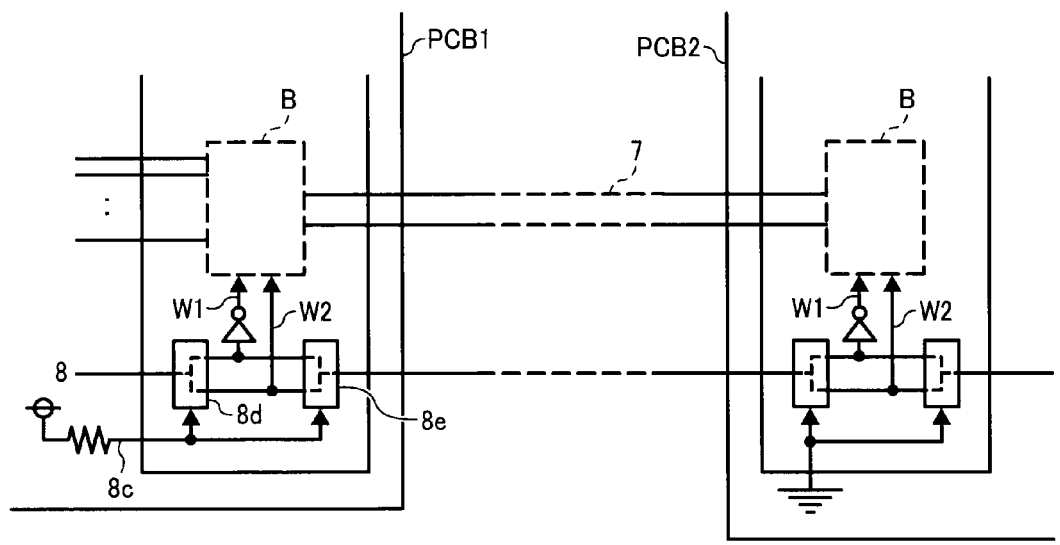
FIG. 8 is a circuit diagram of the I/F device for explaining a case where a bidirectional LVDS device of the I/F device has a fixed function as any one of a receiver and a driver and the signal direction of the function block is changed depending on purposes.

Explanation is given with reference to FIG. 8 for a case where the function of a bidirectional LVDS device of the I/F device of the first embodiment has is fixed to any one of a receiver and a driver and the signal direction of the function block is changed depending on purposes.

When the CPU bus 22 is employed, because the PCB1 including the CPU outputs a control signal, the PCB1 is set as a master device. By changing the level of the signal-direction control signal, the signal direction of the PCB2 can be controlled.

For example, as shown in FIG. 8, by setting a driver/receiver setting terminal 8c at the H level (for example, a voltage is applied thereto) in the PCB1 and setting the driver/receiver setting terminal 8c at the L level (for example, grounded), the bidirectional LVDS devices can function as a drover and a receiver, respectively. To control the signal direction, the logic of the signal-direction control signal 8 needs to be inverted between the driver and the receiver as explained above with reference to FIG. 2.

When the signal-direction control signal 8 at the H level is input to the PCB1 serving as a driver, the PCB1 transmits a signal because the signal-direction control signal 8 at the H level is output for the writing operation, and the signal at the L level is output for the reading operation. Specifically, based on the level (H level) of the signal-direction control signal 8 output from the driver/receiver setting terminal 8c, a signal logic selecting unit 8d selects a second wire W2 to input the signal-direction control signal 8 to the function block B. Similarly, a wire is selected in the PCB2 based on the level of the signal-direction control signal 8 output from the driver/receiver setting terminal 8c. In the PCB2 (receiver), because the signal-direction control signal 8 is at the L-level, the signal logic selecting unit 8d selects a first wire W1, so that the logic level of the signal-direction control signal 8 is opposite to that in the PCB1.

When a function block is set as (fixed to) a driver or a receiver (I/F device), it is required to determine the signal direction. Based on the signal level (the H level or the L level) at the driver/receiver setting terminal 8c, an input/output (I/O) selecting unit 8e determines which of the driver (PCB1) and the receiver (PCB2) outputs a signal and which of the driver and the receiver receives a signal. In the case shown in FIG. 8, a signal is output from the driver and the signal is input to the receiver. One of a transmitter or a receiver that the function block B of the PCB1 functions as is selected based on the level of the signal-direction control signal 8. If the function block B of the PCB2 is configured to select the opposite function as the function block B of the PCB1, a configuration other than that shown in FIG. 8 can be employed.

By controlling the function blocks that includes the data bus 22c requiring the bidirectional communications with the above-explained circuit and the signal-direction control signal 8, the functions as a driver and a receiver can be changed between the blocks. When the writing operation is performed, the signal-direction control signal 8 is set to the H level. In this case, because the second wire W2 is connected to the function block B in the driver, the control signal (H-level) is input to the function block B, so that the function block B is made output a signal. In the receiver, on the other hand, because the signal-direction control signal 8 is transmitted via the first wire W1, the signal-direction control signal 8 at the low level is input to the function block B. To perform the reading operation, the same process as above is performed except that the signal-direction control signal 8 is set at the L-level.

With the conventional technology, although signals having transmitted via an LVDS bus line can be converted into a serial signal and unidirectional communication can be realized, bidirectional communication cannot be achieved. Although there already exists an IC achieving bidirectional communications, in which each signal line having each signal direction can be applied to the LVDS, only one signal can be transmitted via each signal line. For long-distance transmission, serial communications can be employed, using, for example, an universal serial bus (USB). However, the serial communications are susceptible to noise, and the communication speed and the processing speed thereof are not at a sufficient level.

According to the first embodiment, the I/F device enables bidirectional communications using parallel signals by the LVDS, and achieves long-distance transmission with low noise. Because devices can be included in one package, the cost can be reduced. In addition, because a function block is capable of any of unidirectional transmission and bidirectional transmission, the function block can be applied to existing bus systems such as a CPU bus. Specifically, a set of an S/P converter and an LVDS driver for data transmission and a set of an S/P converter and an LVDS receiver for data reception are mounted on one package as a function block. By selecting one of the functions of the data reception and the data transmission depending on purposes, bidirectional transmission can be achieved using parallel signals by the LVDS. By installing a plurality of function blocks in one package, bidirectional transmission and unidirectional transmission become selectable, so that communications can be achieved in a system in which both the unidirectional transmission and the bidirectional transmission are performed via, for example, a CPU bus.

A copier according to a second embodiment of the present invention, to which the interface device of the first embodiment is applied, is explained below.

Figure 9:
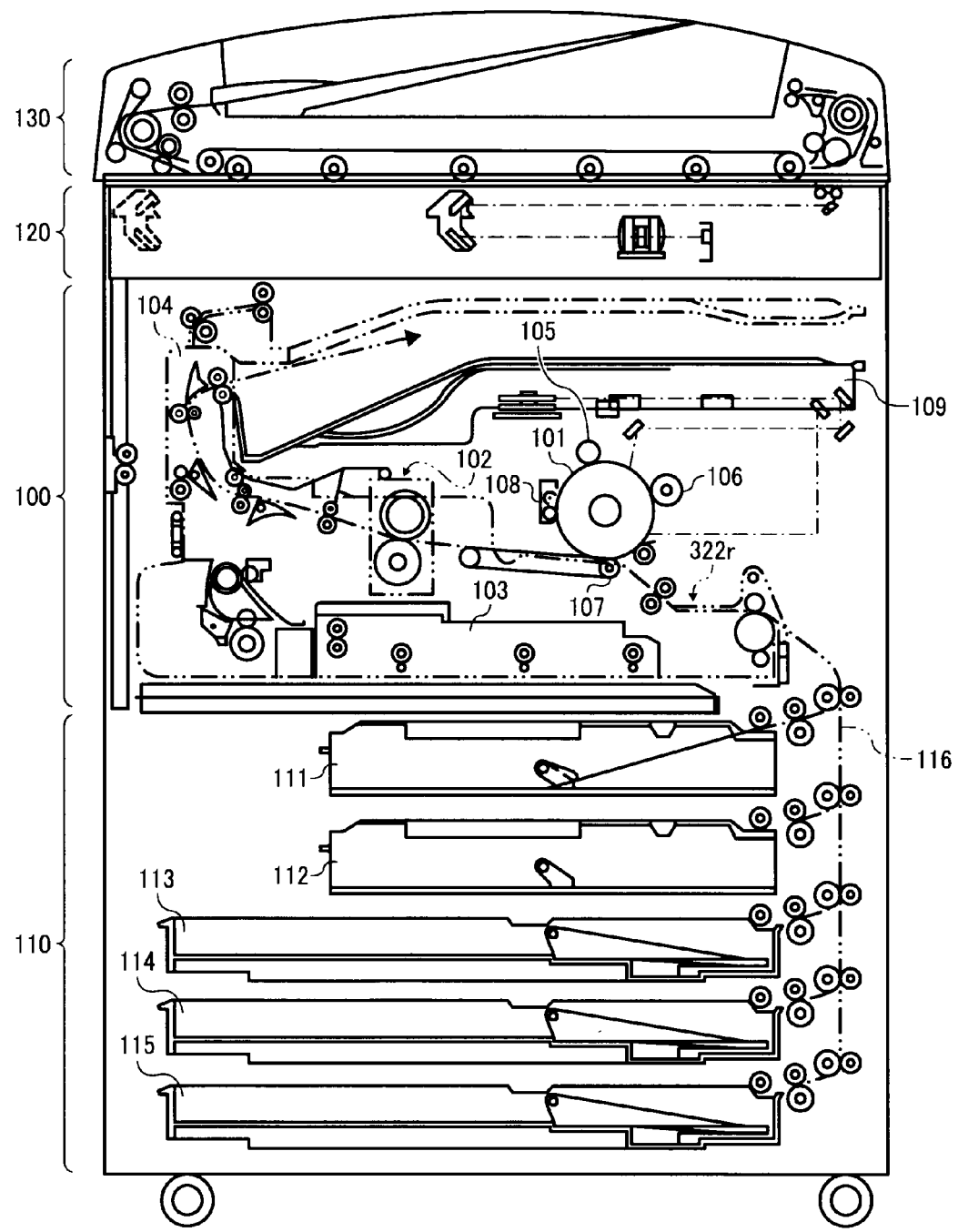
FIG. 9 is a schematic diagram of an image forming apparatus according to a second embodiment of the present invention.
Figure 10:
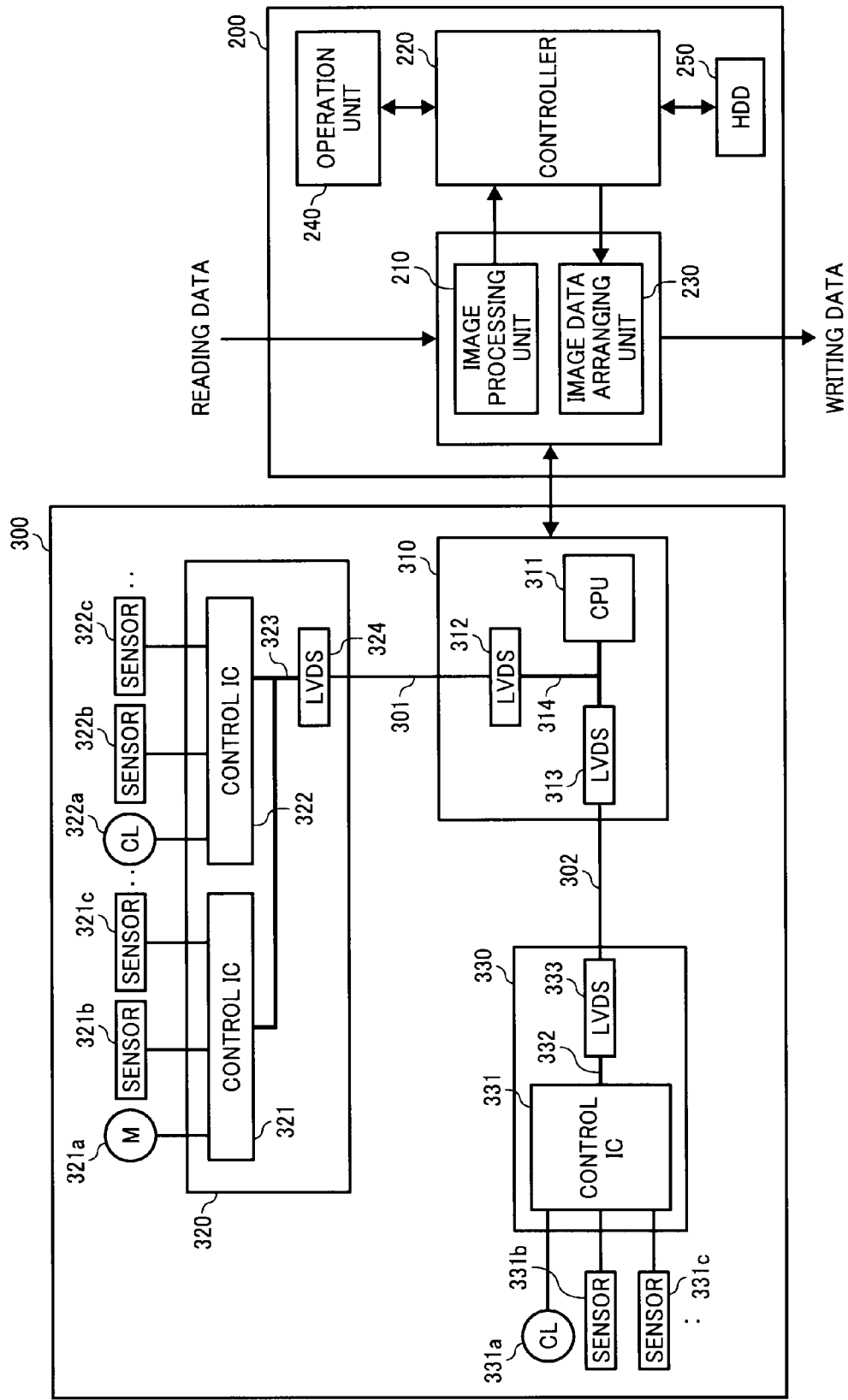
FIG. 10 is a block diagram of relevant part of the image forming apparatus shown in FIG. 9.

FIG. 9 is a schematic diagram of the copier, and FIG. 10 is a block diagram of relevant part of the copier that control the copier. The copier includes a body unit 100, a sheet feeding unit 110, a reading unit 120, and an auto document feeder (ADF) 130. The body unit 100 is positioned above the sheet feeding unit 110, the reading unit 120 is positioned above the body unit 100, and the ADF 130 is positioned above the reading unit 120.

The copier forms an image by electrophotography. The body unit 100 includes a photosensitive element 101, a fixing device 102, a double side unit 103, and a sheet ejecting device 104. Around the photosensitive element 101, a charging unit 105, a developing unit 106, a transfer unit 107, a cleaning unit 108, and a neutralizing unit (not shown) are arranged. The body unit 100 further includes a writing unit 109 that writes an image. The writing unit 109 includes an optical device such as an LD and a driver IC. The optical device is driven (flashes) by the driver IC based on the data transmitted to write the image on a surface of the photosensitive element 101.

The sheet feeding unit 110 includes sheet cassettes 111, 112, 113, 114, and 115. A sheet is fed from a selected cassette by feeding rollers, and is conveyed to the transfer unit 107 via a vertical path 116. The writing unit 109 writes the image on the surface of the photosensitive element 101 to form an electrostatic latent image thereon. The reading unit 120 reads an original sheet set on an exposure glass by scanning the original sheet in a sub-scanning direction (i.e., a flat bed method). Alternatively, the original sheet is read while being conveyed by the ADF 130 in a state where a moving unit remains stationary (i.e., a sheet through method). The flat bed method is employed to read, for example, a page of a book, and the sheet through method is employed to read, for example, a plurality of sheets. The ADF of the second embodiment is explained as an auto reverse document feeder (ARDF) that can read both sides of a sheet by reversing the sheet.

As shown in FIG. 10, the copier further includes an image data processing unit 200 that processes an image, an engine control unit 300 that controls the copier (for example, controls timing of conveying a sheet). The image data processing unit 200 includes an image processing unit 210, a controller 220, an image data arranging unit 230, an operation unit 240, and a hard disk drive (HDD) 250. The image processing unit 210 includes a plurality of processors. Image data read by the reading unit 120 and then converted into digital data is input to the image processing unit 210, and each processor performs necessary image processing, such as shading correction and background removal.

The controller 220 including a plurality of processors controls, for example, the timing of outputting image data in an image system. Image data on which the image processing has been performed is temporarily stored in the HDD 250. Alternatively, image data is stored in the memory of the controller 220. The controller 220 fetches required data from the HDD 250 according to the timing of outputting the image data, and transmits the image data to the image data arranging unit 230. The image data arranging unit 230 includes a line memory corresponding to a writing width of an image. The data transmitted from the controller 220 is arranged in the line memory based on an image area. A first-in first-out (FIFO) memory is employed as the memory, and the data is sequentially transmitted from the line memory to a writing control unit from a first bit of the data.

The operation unit 240 functions as a user interface that includes a hardware key, a software key, and a display unit via which a user issues an instruction and on which, for example, a message is displayed for the user.

The engine control unit 300 includes a main control PCB 310, a first unit control PCB 320, and a second unit control PCB 330. The first and second unit control PCBs 320 and 330 are connected to the main control PCB 310 via first and second LVDS cables 301 and 302 and connected to each unit. The main control PCB 310 includes a CPU 311, and first and second bidirectional LVDS devices 312 and 313 that are connected to the CPU 311 via a CPU bus 314. The first bidirectional LVDS device 312 is connected to the first unit control PCB 320 via the first LVDS cable 301. The second bidirectional LVDS device 313 is connected to the second unit control PCB 330 via the second LVDS cable 302. In the second embodiment, the bidirectional communications by the LVDS is applied to the CPU bus to control a plurality of units distant from the CPU 311. Specifically, the bidirectional communications are applied to the engine control unit 300 that controls the copier.

The main control PCB 310 is connected to various types of loads such as an interface board, a drive board, a reading load, and a writing load. The CPU bus 314 extends from the CPU 311. When signals are output from the CPU 311 to the unit control PCBs 320 and 330, the CPU bus 314 is connected to the unit control PCBs 320 and 330 via the bidirectional LVDS devices 312 and 313. The bidirectional LVDS devices 312 and 313 are connected by a connector.

The first unit control PCB 320 includes first and second control ICs 321 and 322. A bidirectional LVDS device 324 of the first unit control PCB 320, which is connected to a CPU bus 323, performs bidirectional communications with the main control PCB 310 via the first LVDS cable 301. The first control IC 321 is connected to, for example, a motor 321a, and sensors 321b and 321c. The second control IC 322 is connected to, for example, a clutch 322a, and sensors 322b and 322c.

The second unit control PCB 330 includes a third control IC 331. A bidirectional LVDS device 333 of the second unit control PCB 330, which is connected to the CPU bus 332, performs bidirectional communications with the main control PCB 310 via the second LVDS cable 302. The third control IC 331 is connected to, for example, a clutch 331a and sensors 331b and 331c.

Regarding the first and second unit control PCBs 320 and 330, signals transmitted via the CPU bus 314 are received by the bidirectional LVDS devices 324 and 333 and are converted into parallel signals to be transmitted via the CPU buses 323 and 332. Thereafter, the parallel signals are input to the first to third control ICs 321, 322, and 331. The first to third control ICs 321, 322, and 331 are controlled via the CPU buses 323 and 333 and are each, for example, a widely-used I/O extension IC that operates according to an instruction issued by the CPU 311. The CPU 311 controls the first to third control ICs 321, 322, and 331 in a way that address spaces allocated to the first to third control ICs 321, 322, and 331 are accessed via the CPU buses 323 and 332, and accordingly, each port is controlled.

The CPU buses 314, 323, and 332 can be used to control a plurality of devices using selecting signals. If three select signals are used, for example, two of the select signals are allocated to an I/O board (IOB) arranged in an optimum position for connecting to loads to be controlled, and one of the select signals is allocated to a reading I/O control PCB.

The reading I/O control is performed in the following manner. A plurality of sensors necessary for detecting the size of an original sheet is connected to a port of the I/O extension IC. By controlling the IO extension IC, the CPU 311 can obtain information from the sensors. Thus, the signal lines that would be otherwise required to connect the sensors to the CPU 311 are replaced with signal lines converted to those of a serial LVDS CPU bus only.

In addition, the first and second unit control PCBs 320 and 330 can be arranged in optimum positions such that the loads controlled by the unit control PCBs 320 and 330 are connected to the unit control PCBs 320 and 330 via the shortest routes.

For example, it suffices that the unit control PCB that controls reading is arranged in the reading unit 120. To control the sheet feeding unit 110, for example, it suffices that a unit control PCB for controlling the sheet feeding unit 110 is arranged in a position in the sheet feeding unit 110 such that the unit control PCB is connected to loads controlled by the unit control PCB via the shortest route. If loads of the sheet feeding unit 110 are concentrated on a left below side of the back side of the copier, it is possible to connect the loads, which would otherwise be connected to the unit control PCB via a longer distance, to the unit control PCB with a wiring harness via the shortest route by positioning the unit control PCB on the left below side of the back side of the copier. Furthermore, the unit control PCBs are connected to the main control PCB 310 easily with LVDS cables only.

When the first and second unit control PCBs 320 and 330 control a large number of loads, a plurality of control ICs each serving as an IO extension IC may be installed as in the case of the first unit control PCB 320. In this case as well, the main control PCB 310 is connected to the first and the second unit control PCBs 320 and 330 controlled by the main control PCB 310 via the LVDS cables only that connects the CPU buses.

Figure 11:
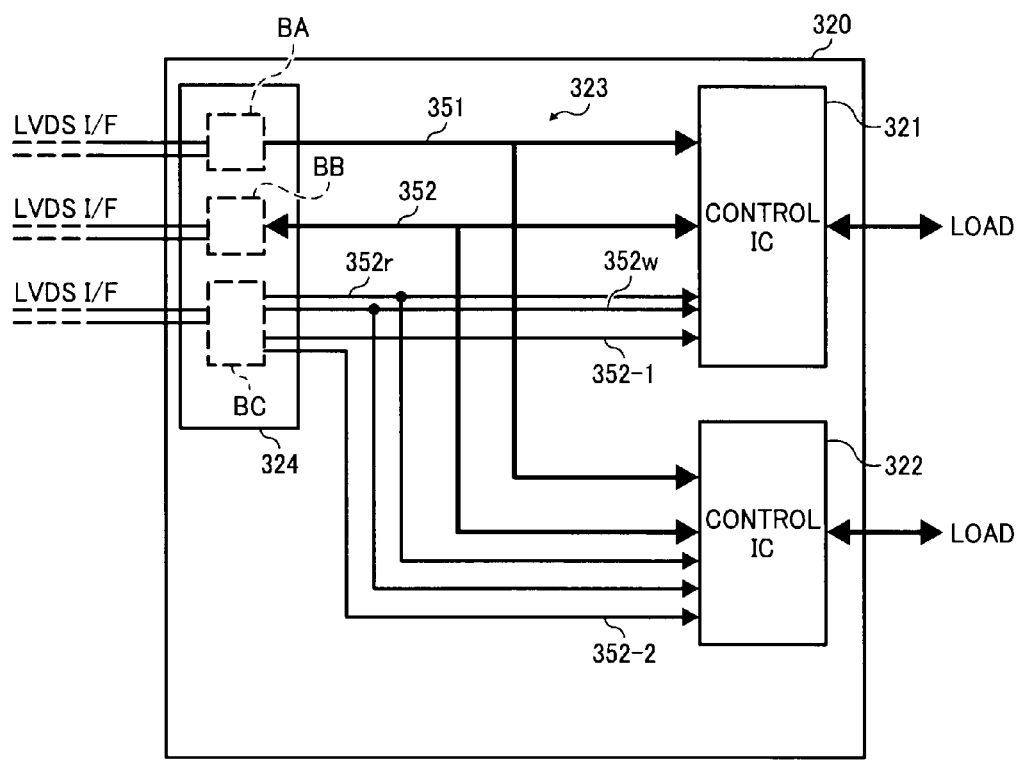
FIG. 11 is a block diagram of a second unit control PCB shown in FIG. 10.

FIG. 11 is a block diagram of the first unit control PCB 320. When the first and second control ICs 321 and 322 are required (i.e., a plurality of IO extending IC is required) to control a large number of loads such as a sensor and a clutch to which signals are input and from which signals are output, as shown in FIG. 11, it suffices that the CPU bus serving as a parallel bus via the bidirectional LVDS device 323 is branched and connected to the first and second control ICs 321 and 322. It suffices that a plurality of selecting signals are output from the main control PCB 310 and transmitted to the first and second control ICs 321 and 322.

For example, the CPU bus 323 includes an address bus 351 and a data bus 352, and a control signal bus via which various types of control signals are transmitted. To control the first and second control ICs 321 and 322, it suffices that a first selecting signal 352-1 and a second selecting signal 352 are transmitted respectively to the first control IC 321 and the second control IC 322 in addition to a write signal 352w and a read signal 352r.

Figure 12:
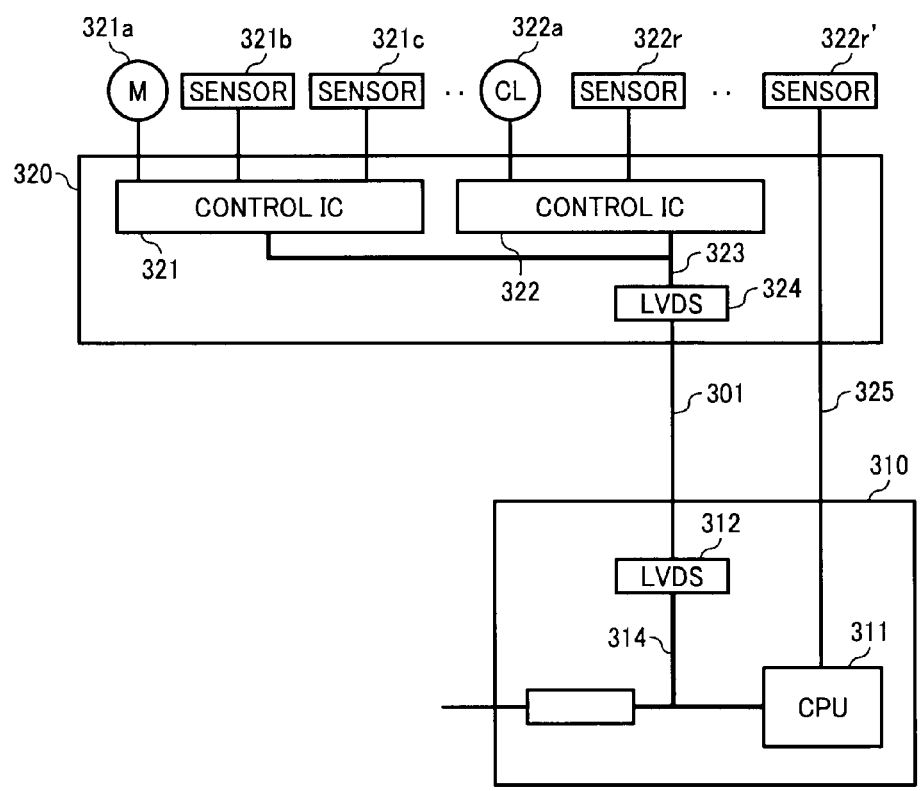
FIG. 12 is a block diagram for explaining a case where a signal is transmitted without being converted into an LVDS signal.

An interruption signal requiring accurate timing can be transmitted without being converted into an LVDS signal. FIG. 12 is a block diagram for explaining the case where such a signal is transmitted without being converted into an LVDS signal. Interruption may be employed for controlling the system not only in the copier but also in other devices. The interruption includes internal interruption employed for the program and external interruption via a signal transmitted from an external device. The external interruption is explained with reference to FIG. 12.

In the process for writing an image after a process for conveying a sheet, highly accurate timing of writing the image is required. If the timing is inappropriate, inconveniences can be caused, for example, the width of unprinted area of the sheet changes, which extends from the edge of the sheet to the image printed on the sheet. To prevent such inconvenience, a registration sensor 322r shown in FIG. 9 is configured to detect that the edge of the sheet reaches a position where the writing is started. By inputting a signal output from the registration sensor 322r to the CPU 311 as the external interruption, the position of the edge of the sheet is preferentially detected on the program. Thereafter, the next step of the process for writing the image is started.

To connect the registration sensor 322r positioned as shown in FIG. 9 to the second unit control PCB 320, the registration sensor 322r is connected to a port of the second control IC 322. The second control IC 322 also has an interruption port, and a signal input to the interruption port is output to the main control PCB 310 as an interruption signal. If the interruption signal is directly input to the main control PCB 310 without being converted into an LVDS signal, the interruption signal can be transmitted to the main control PCB 310 without delay. If a few number of signal lines for transmitting interruption signals are arranged, a large current does not flow, and thus, an erroneous operation or noise is not caused. As shown in FIG. 12, a signal output from a registration senor 322r' can be directly transmitted to the CPU 311 via a signal line 325 without the interruption port of the second control IC 322. If the signal is allocated to an extra connector pin of the LVDS cable of the CPU bus 323, no additional wiring harness is required.

By realizing centralized control that simplifies a sequence of turning on the power source (hereinafter, "turning-on sequence") with the CPU bus, it is possible to simplify designing the turning on-sequence of a main power source.

Typically, a reset signal is input to a CPU to initialize the CPU to prevent erroneous operation when a main power source is on. Furthermore, by reducing the voltage having decreased to a certain level to 0 V while the main power source is off, it is possible to prevent an erroneous operation caused due to a voltage at an unstable level. In a case where the system includes a plurality of CPUs, it is required to design the turning-on sequence and a turning-off sequence in consideration of specifications of the CPUs. This is because, for example, a communication error is caused if a CPU other than the CPU installed on a bus control unit (BCU) is not active after the CPU installed on the BCU becomes active, or the CPUs other than the CPU on the BCU needs to become active after the CPU installed on the BCU becomes active.

Figure 13:
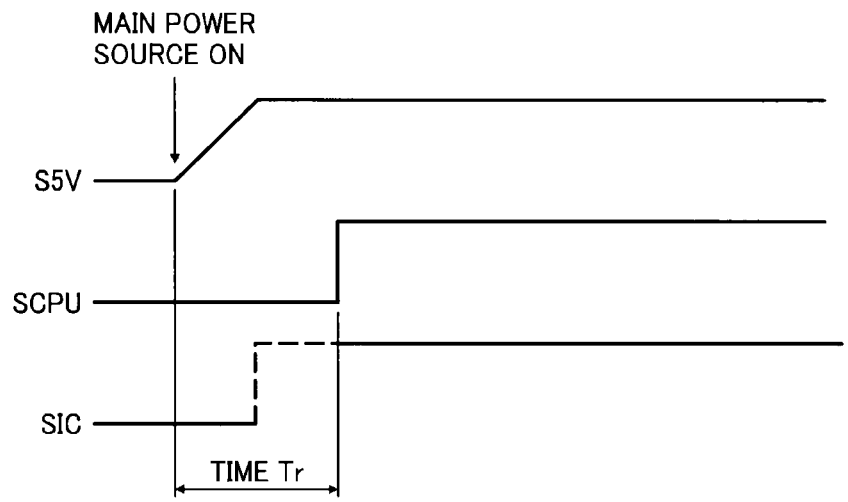
FIG. 13 is a timing chart of a timing relationship between a main power source and a 5V power source, a CPU power source, and a control IC power source.

Because the CPU 311 controls the above timing (i.e., centralized control is performed for the above timing), it suffices that the timing with respect the CPU 311 is taken into consideration even though reset signals need to be input to, for example, the first to third control ICs 321, 322, and 331. FIG. 13 is a timing chart of a timing relationship between a main power source and a 5V power source S5V, a CPU power source SCPU, and a control IC power source SIC. For example, as shown in FIG. 13, when the first control IC 321 needs to be on before the CPU 311 is on and a reset time of the CPU 311 is set to 100 milliseconds, a reset time shorter than 100 milliseconds (for example, 50 milliseconds), i.e., timing within time Tr shown in FIG. 13, is set to each of the second and third control ICs 322 and 331 such that the specification of each IC is satisfied.

As described above, according to an embodiment of the present invention, it is possible to select any one of functions of bidirectional transmission and unidirectional transmission, and an existing bus such as a CPU bus can be used for connection.

Moreover, it is possible to reduce the number of steps for developing software of control IC, such as CPU and field programmable gate array (FPGA), installed on each unit and simplify the system configuration.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An interface device comprising a package on which a function block is mounted, the function block including:
   a parallel-to-serial converting unit configured to convert parallel signals, which are input in parallel thereto, to a single-end signal;
   a low voltage differential signaling (LVDS) driver configured to convert the single-end signal from the parallel-to-serial converting unit to an LVDS signal;
   an LVDS receiver configured to convert an LVDS signal, which is input thereto, to a single-end signal; and
   a serial-to-parallel converting unit configured to convert the single-end signal from the LVDS receiver to parallel signals, wherein
   the parallel-to-serial converting unit and the LVDS driver are utilized to transmit data,
   the LVDS receiver and the serial-to-parallel converting unit are utilized to receive data,
   the function block utilizes a CPU bus,
   each component in the package switches a transmission direction so as to transmit data when a binary input signal is at a low level, and so as to receive data when the binary input signal is at a high level, and
   a read signal, which is issued by a CPU to the CPU bus, which is at the low level when the CPU issues an instruction for a reading operation, and which is at the high level when the CPU issues no instruction for a reading operation, is input as an AND signal with a signal at the high level via an AND circuit to each component in the package.

2. The interface device according to claim 1, wherein the function block mounted on the package serves as a driver or receiver for bidirectional communication.

3. An information forming apparatus comprising an interface device including a package on which a function block is mounted, the function block including:
   a parallel-to-serial converting unit configured to convert parallel signals, which are input in parallel thereto, to a single-end signal;

a low voltage differential signaling (LVDS) driver configured to convert the single-end signal from the parallel-to-serial converting unit to an LVDS signal;
an LVDS receiver configured to convert an LVDS signal, which is input thereto, to a single-end signal; and
a serial-to-parallel converting unit configured to convert the single-end signal from the LVDS receiver to parallel signals, wherein
the parallel-to-serial converting unit and the LVDS driver are utilized to transmit data,
the LVDS receiver and the serial-to-parallel converting unit are utilized to receive data,
the function block utilizes a CPU bus,
each component in the package switches a transmission direction so as to transmit data when a binary input signal is at a low level, and so as to receive data when the binary input signal is at a high level, and
a read signal, which is issued by a CPU to the CPU bus, which is at the low level when the CPU issues an instruction for a reading operation, and which is at the high level when the CPU issues no instruction for a reading operation, is input as an AND signal with a signal at the high level via an AND circuit to each component in the package.

* * * * *